(12) United States Patent
Nantais et al.

(10) Patent No.: US 9,457,707 B2
(45) Date of Patent: Oct. 4, 2016

(54) VEHICLE AUXILIARY LAMP UNIT

(71) Applicant: Nissan North America, Inc., Franklin, TN (US)

(72) Inventors: Jason Nantais, Royal Oak, MI (US); Mark Contardi, Farmington, MI (US); Christopher Prisby, Farmington Hills, MI (US); Kent Agne, South Lyon, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 234 days.

(21) Appl. No.: 14/486,710

(22) Filed: Sep. 15, 2014

(65) Prior Publication Data

US 2016/0076720 A1    Mar. 17, 2016

(51) Int. Cl.
*B60Q 1/00* (2006.01)
*B60Q 1/26* (2006.01)
*F21S 8/10* (2006.01)

(52) U.S. Cl.
CPC ........... *B60Q 1/0041* (2013.01); *B60Q 1/2607* (2013.01); *F21S 48/211* (2013.01); *F21S 48/215* (2013.01); *F21S 48/2206* (2013.01); *F21S 48/2237* (2013.01); *F21S 48/2268* (2013.01); *F21S 48/2287* (2013.01); *F21S 48/234* (2013.01); *F21S 48/24* (2013.01); *B60Q 2400/30* (2013.01)

(58) Field of Classification Search
CPC . B60Q 1/0041; B60Q 1/2607; F21S 48/211; F21S 48/215; F21S 48/2206; F21S 48/2237; F21S 48/2268; F21S 48/2287; F21S 48/234; F21S 48/24
See application file for complete search history.

(56) References Cited

U.S. PATENT DOCUMENTS

| | | | |
|---|---|---|---|
| 7,086,765 B2 | 8/2006 | Wehner | |
| 8,057,081 B2 | 11/2011 | Schwab | |
| 8,465,185 B2 | 6/2013 | Verhee | |
| 8,752,986 B2 | 6/2014 | Wuerthele et al. | |
| 2011/0051446 A1* | 3/2011 | Saito | F21K 9/00 362/509 |
| 2011/0228549 A1 | 9/2011 | Lindsay et al. | |
| 2011/0242831 A1* | 10/2011 | Okui | F21S 48/115 362/511 |
| 2011/0255298 A1 | 10/2011 | Lindsay et al. | |
| 2012/0051077 A1* | 3/2012 | Arai | F21S 48/115 362/516 |
| 2012/0069592 A1 | 3/2012 | Natsume et al. | |

* cited by examiner

*Primary Examiner* — Mary Ellen Bowman
(74) *Attorney, Agent, or Firm* — Global IP Counselors, LLP

(57) ABSTRACT

A vehicle auxiliary lamp unit includes a first circuit board and an elongated light pipe. The first circuit board has a plurality of first light sources and at least one aperture. The elongated light pipe has a proximal end and a distal end. The proximal end is located by the first circuit board and arranged to receive light from a first of the plurality of first light sources. The proximal end of the elongated light pipe includes at least one locating projection that is received by the at least one aperture of the first circuit board.

20 Claims, 10 Drawing Sheets

VEHICLE AUXILIARY LAMP UNIT

BACKGROUND

1. Field of the Invention

The present invention generally relates to an auxiliary lamp unit for a vehicle headlamp assembly. More specifically, the present invention relates to an auxiliary headlamp unit having a plurality of light sources that illuminates a first area of the auxiliary headlamp and an elongated light pipe that illuminates a second area of the auxiliary headlamp.

2. Background Information

Most vehicles include a pair of vehicle headlamp assemblies for illuminating an exterior area in front of the vehicle. Each of the vehicle headlamp assemblies often includes a primary light unit as well as an auxiliary light unit. The primary light unit serves as a primary illumination source for the vehicle, while the auxiliary light unit is often provided as a supplemental light unit. The auxiliary light unit typically functions as parking lamps, daytime running lamps, fog lights, off-road utility lights as well as various other signaling devices. In addition to providing light, auxiliary lamp units are considered decorative with respect to the vehicle. Many modern automotive vehicle headlamp assemblies have begun using light emitting diodes (LEDs) as a form of light source, especially for auxiliary light units. Automakers often combine two separated light sources for auxiliary lamp units, such as using a light pipe and a reflector structure to provide an aesthetically pleasing light structure along the edge of a headlamp assembly.

SUMMARY

Generally, the present disclosure is directed to a vehicle auxiliary lamp unit. Typically, the vehicle auxiliary lamp unit is part of vehicle headlamp assembly.

In view of the state of the known technology, one aspect of the disclosure provides a vehicle auxiliary lamp unit that comprises a first circuit board and an elongated light pipe. The first circuit board has a plurality of first light sources and at least one aperture. The elongated light pipe has a proximal end and a distal end. The proximal end is located by the first circuit board and is arranged to receive light from a first of the plurality of first light sources. The proximal end of the elongated light pipe includes at least one locating projection that is received by the at least one aperture of the first circuit board.

In view of the state of the known technology, another aspect of the disclosure provides a vehicle auxiliary lamp unit comprising a first circuit board, an elongated light pipe and a reflector. The first circuit board has a plurality of first light sources. The elongated light pipe has a proximal end and a distal end, and is arranged to receive light from a first of the plurality of first light sources. The reflector includes a first curved reflective portion and at least one second curved reflective portion. The first curved reflective portion is disposed behind the elongated light pipe to reflect light from a second of the plurality of first light sources. The at least one second curved reflective portion is located offset from the first curved reflective portion and is arranged to receive light from the other of the plurality of first light sources. The at least one second curved reflective portion is integrally formed with the first curved reflective portion to define a first section of the reflector. The first section of the reflector has an overall elongated shape extending in a direction transverse to a longitudinal axis of the light pipe.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
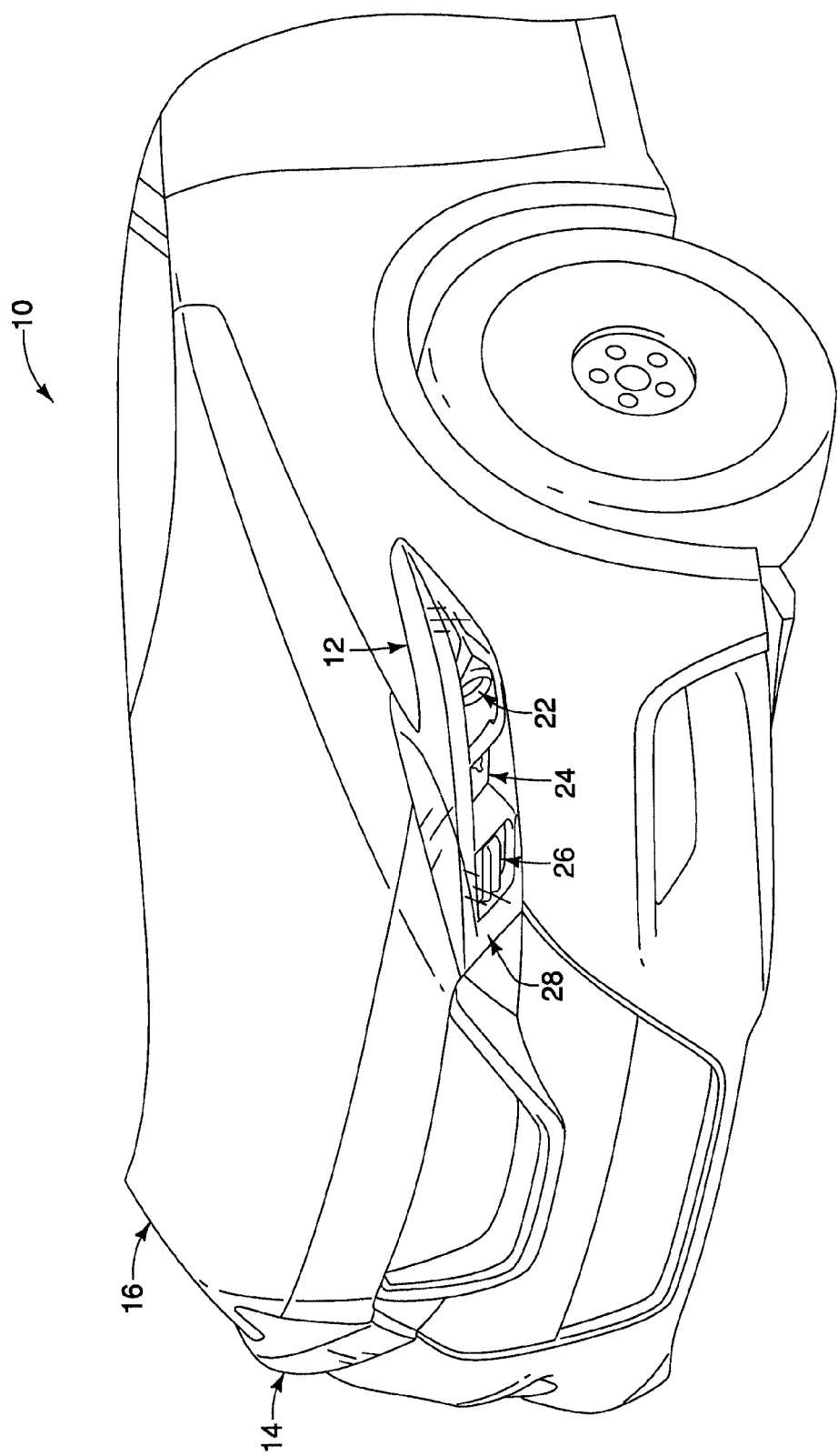
FIG. 1 is a perspective view of a vehicle with a vehicle headlamp assembly that includes a vehicle auxiliary light unit in accordance with one illustrated embodiment.

Referring initially to FIG. 1, a portion of a vehicle 10 is illustrated that has a pair of vehicle headlamp assemblies 12 and 14 in accordance with a first embodiment. The vehicle 10 has a vehicle body 16 that has the vehicle headlamp assemblies 12 and 14 provided at opposite front corners of the vehicle body 16. The vehicle headlamp assemblies 12 and 14 are identical, except that they are mirror images of each other. For the sake of brevity, only the vehicle headlamp assembly 12 will be discussed and illustrated in further detail herein.

Figure 2:
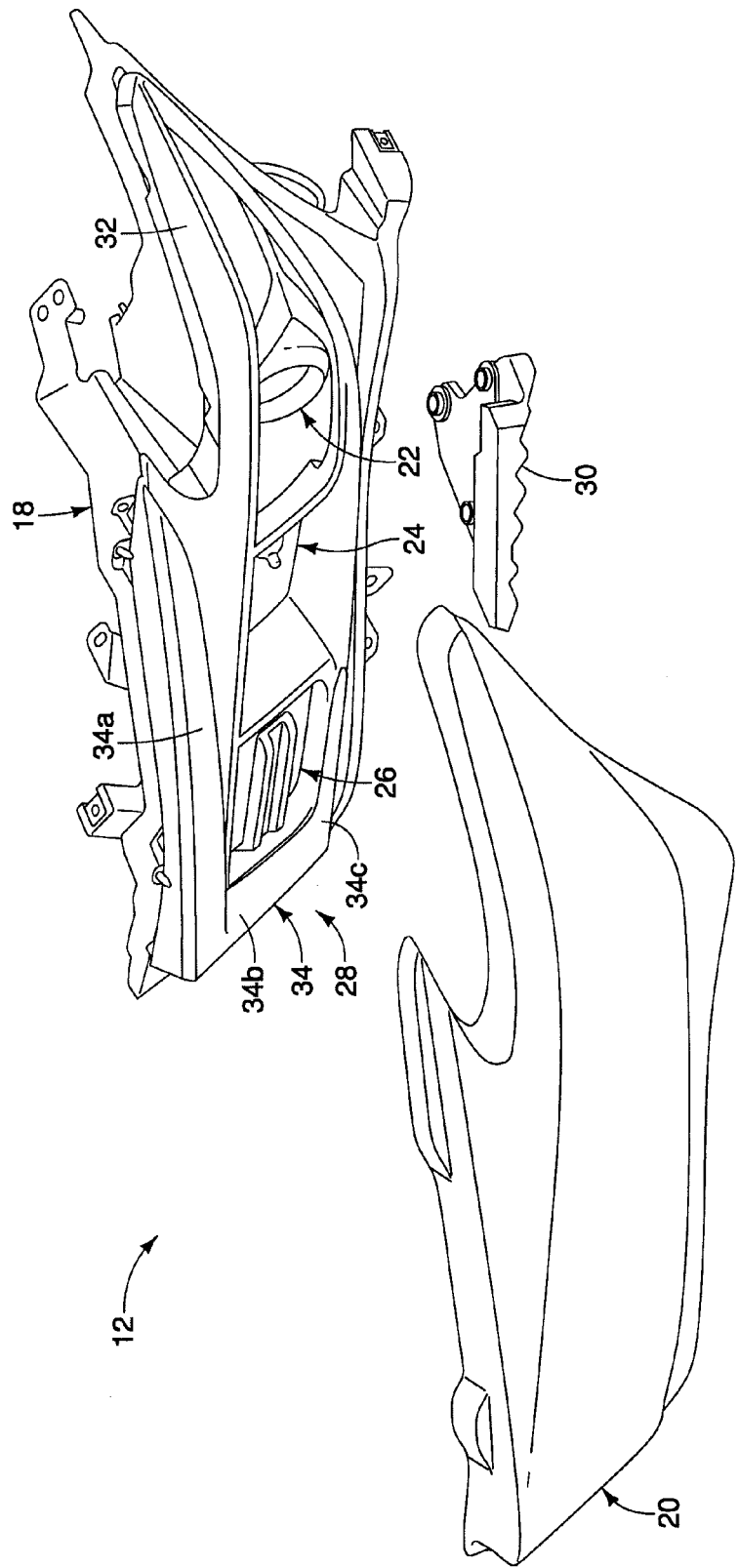
FIG. 2 is an exploded perspective view of selected parts of the vehicle headlamp assembly illustrated in FIG. 1.
Figure 3:
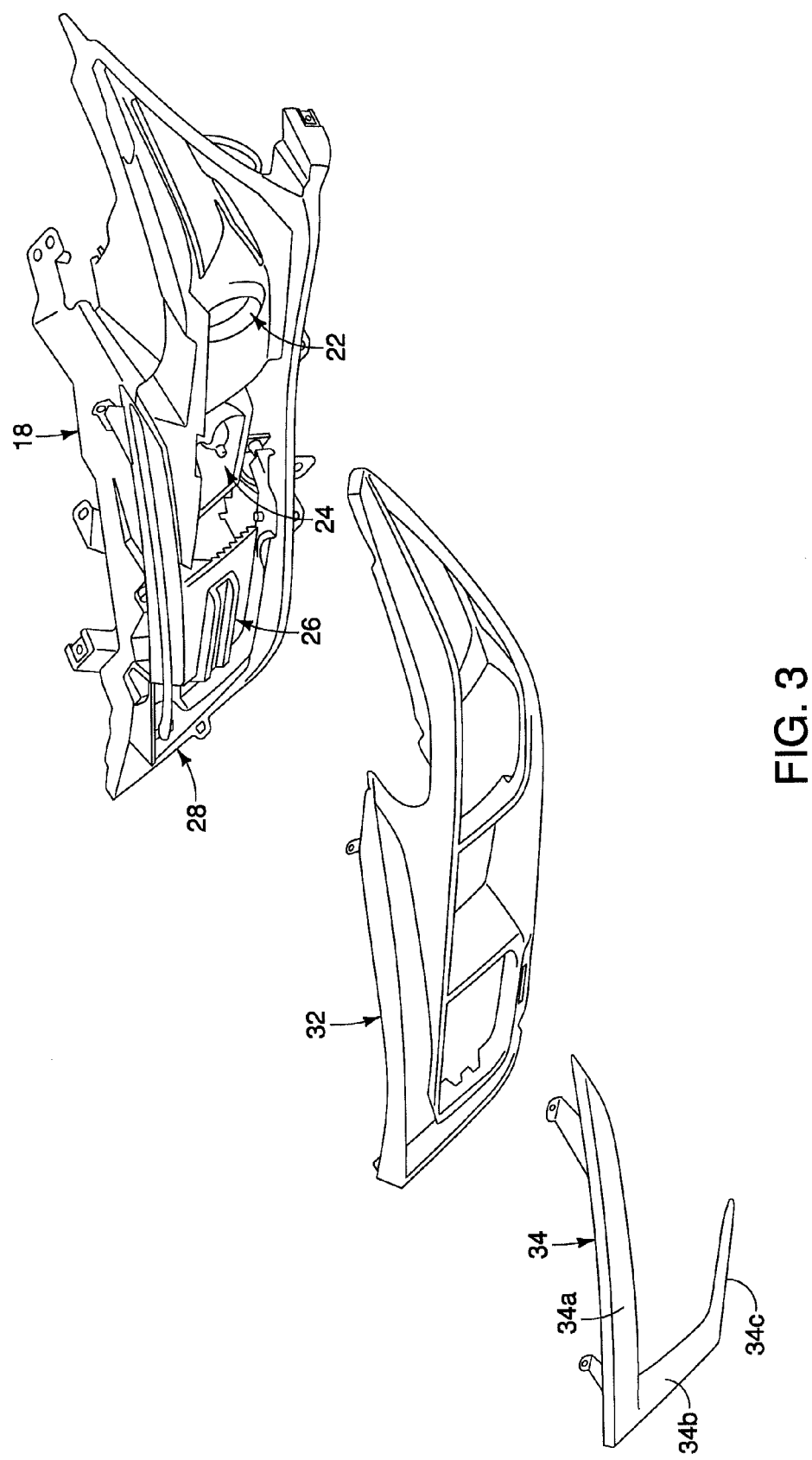
FIG. 3 is an exploded perspective view of selected parts of the vehicle headlamp assembly illustrated in FIGS. 1 and 2, exposing the auxiliary light unit mounted to the lamp housing.

Referring now to FIGS. 2 and 3, the vehicle headlamp assembly 12 basically includes a lamp housing 18 and a transparent outer lens cover 20. The lamp housing 18 is constructed of a rigid non-transparent material, and is fastened to the vehicle body 16 with a plurality of fasteners (not shown). The outer lens cover 20 is also made of a transparent or translucent rigid material, and has a shape generally corresponding to the overall shape of the headlamp assembly 12. The lamp housing 18 and the outer lens cover 20 are fastened together in a conventional manner to form a headlamp enclosure that houses a primary lamp unit 22, a secondary lamp unit 24, a supplemental lamp unit 26 and an auxiliary lamp unit 28. The precise construction of the lamp housing 18 is not particularly important to the auxiliary lamp unit 28. Likewise, the construction of the outer lens cover 20 is not particularly important to the auxiliary lamp unit 28. Thus, the lamp housing 18 and the outer lens cover 20 will not be discussed in further detail herein.

The primary lamp unit 22 provides the primary illumination source for nighttime driving. The secondary lamp unit 24 and supplemental lamp unit 26 are also illuminating headlamps that operate as ancillary lamp units to the primary lamp unit 22 with high beam or signaling functions. The auxiliary lamp unit 28 provides parking and daytime running lights (DRL) functions. The primary lamp unit 22, the secondary lamp unit 24 and the supplemental lamp unit 26 are relatively conventional lamp units, and thus, the lamp units 22, 24 and 26, will not be discussed in further detail herein. Rather, the following description will focus on the auxiliary lamp unit 28, which is configured to provide uniform illumination that is visible through the outer lens cover 20.

The vehicle headlamp assembly 12 further includes a mounting bracket 30 that is secured to the bottom of the lamp housing 18 for attaching and supporting the lamp housing 18 to the vehicle body 16. The vehicle headlamp assembly 12 further includes a mounting bezel 32 and an inner auxiliary lens cover 34. The mounting bezel 32 is fastened to the lamp housing 18 to provide a finished look around the primary lamp unit 22, the secondary lamp unit 24, the supplemental lamp unit 26 and the auxiliary lamp unit 28. Thus, in the illustrated embodiment, the mounting bezel 18 is a trim member that outlines the peripheral edges of the primary lamp unit 22, the secondary lamp unit 24, the supplemental lamp unit 26 and the auxiliary lamp unit 28. The mounting bezel 18 also provides additional support and protection for the headlamp assembly 12 against environmental damage. The mounting bezel 32 is a relatively conventional structure, and thus, the mounting bezel 32 will not be discussed in further detail herein.

The inner auxiliary lens cover 34 is fastened to the lamp housing 18, and overlies the auxiliary lamp unit 28. The auxiliary lens cover 34 is formed of a transparent or translucent material, and has a shape corresponding to the shape of the auxiliary lamp unit 28. As described in greater detail below, the inner lens cover 38 includes an inner surface having various optical features in order to optimize the light emitted by the auxiliary lamp unit 30 without degrading the overall aesthetic appearance of the vehicle lamp assembly 16. The auxiliary lamp unit 28 is disposed between the lamp housing 18 and the inner auxiliary lens cover 34. In the illustrated embodiment, the auxiliary lamp unit 28, the mounting bezel 32 and the inner auxiliary lens cover 34 are together fixedly secured to the lamp housing 18. The inner auxiliary lens cover 34 has three lens segments 34a, 34b and 34c that are arranged to define a generally C-shaped lens cover.

Figure 4:
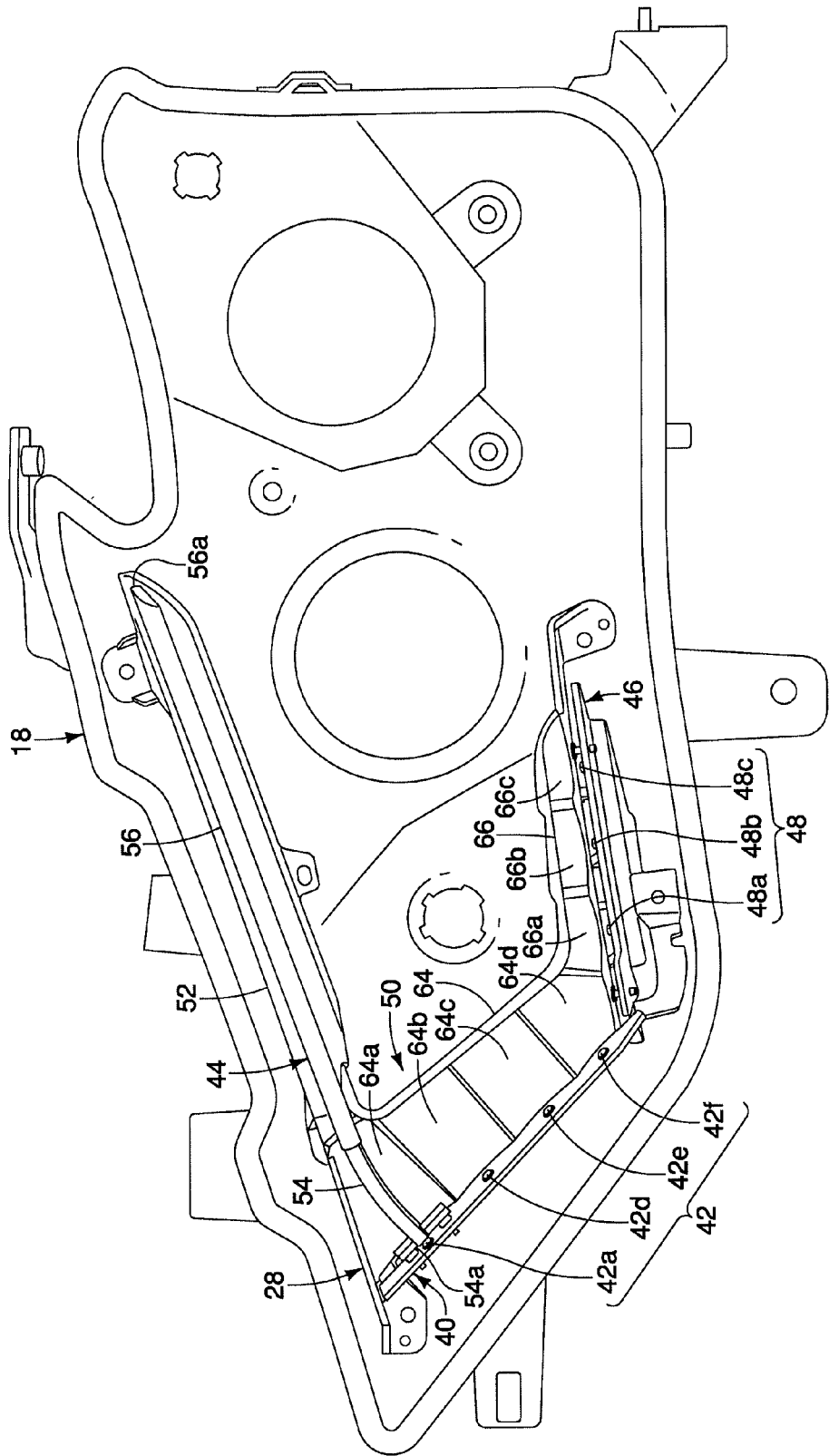
FIG. 4 is an elevational view of the auxiliary light unit disposed inside the lamp housing of the vehicle headlamp assembly with selected parts of the vehicle headlamp assembly removed.
Figure 5:
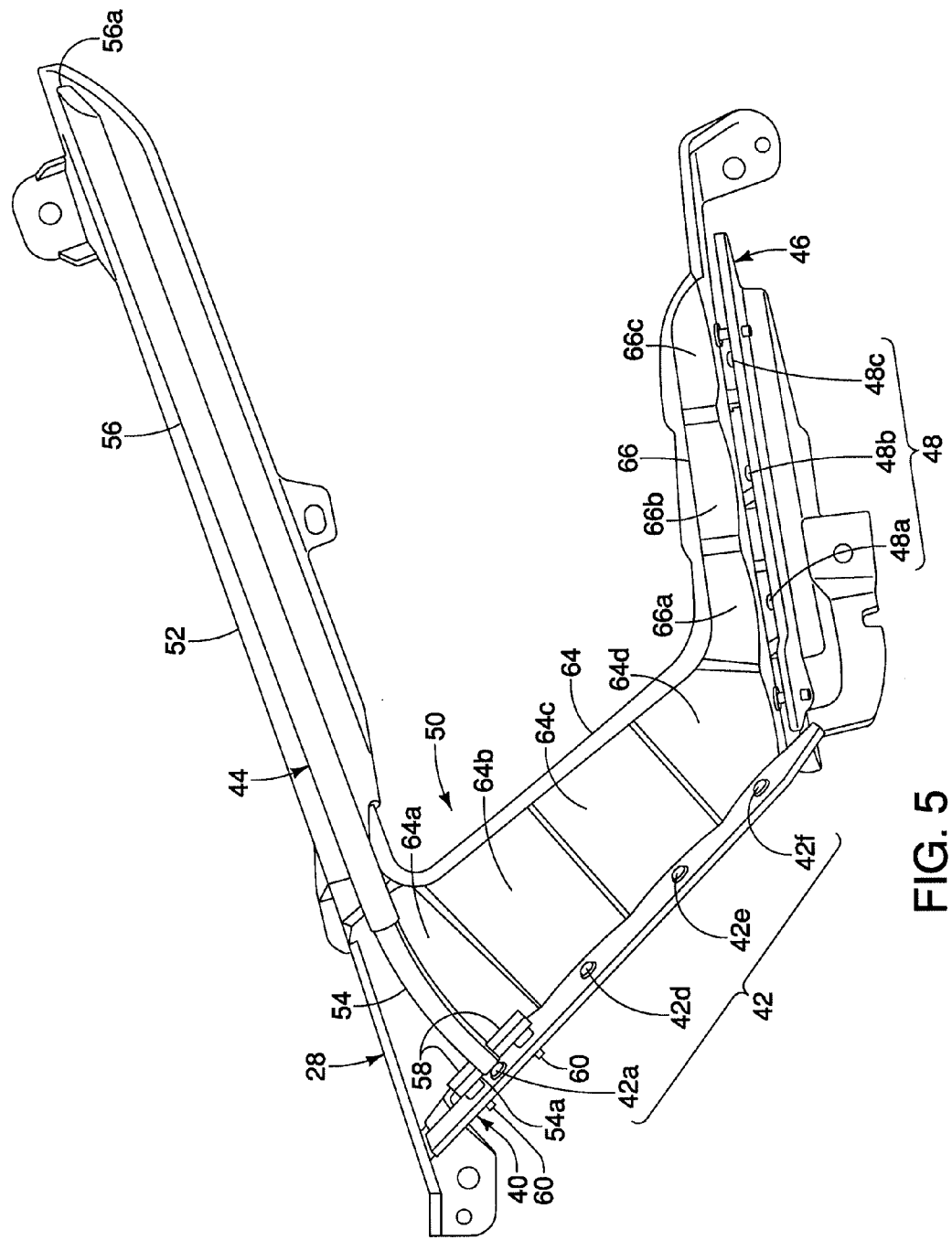
FIG. 5 is an enlarged elevational view of the auxiliary lamp unit of the vehicle headlamp assembly, similar to FIG. 4, but with the lamp housing removed.

Referring now to FIGS. 4 and 5, the auxiliary lamp unit 28 will now be discussed in further detail. Basically, in the illustrated embodiment, the auxiliary lamp unit 28 comprises a first circuit board 40, a plurality of first light sources 42, an elongated light pipe 44, a second circuit board 46, a plurality of second light sources 48 and a reflector 50. Preferably, the vehicle auxiliary lamp unit 28 further comprises a light pipe carrier 52 for supporting the light pipe 44. Of course, it will be apparent from this disclosure that all of the parts of the auxiliary lamp unit 28 may not be necessary depending on the particular application of the auxiliary lamp unit 28.

In the illustrated embodiment, the first circuit board 40 includes the first light sources 42, while the second circuit board 46 includes the second light sources 48. With the illustrated arrangement, the auxiliary lamp unit 28 is designed to provide uniform illumination of the inner auxiliary lens cover 34 towards and through which light from the first and second light sources 42 and 48 is reflected by the light pipe 44 and/or the reflector 50. Thus, the light from the first and second light sources 42 and 48 does not directly shine through the inner auxiliary lens cover 34. Preferably, the first and second light sources 42 and 48 are light emitting diodes (LEDs). However, other suitable light sources can be used as needed and/or desired.

The first and second circuit boards 40 and 46 are printed circuit boards having a substrate with a printed circuit. The printed circuit of the first circuit board 40 interconnects the first light sources 42, and is configured to be connected to a remote power source (e.g., the vehicle battery). The printed circuit of the second circuit board 46 interconnects the second light sources 48, and is configured to be connected to a remote power source (e.g., the vehicle battery). The second circuit board 46 has one edge located adjacent to the first circuit board 40. The substrates of the first and second circuit boards 40 and 46 are disposed relative to each other to define an obtuse angle between the light source supporting surfaces of the substrates of the first and second circuit boards 40 and 46. Preferably, the adjacent edges of the substrates of the first and second circuit boards 40 and 46 are skewed with respect to each other. In this way, the first and second light sources 42 and 48 emit light onto the reflector 50 to illuminate the lens segments 34b and 34c of the inner auxiliary lens cover 34.

Figure 6:
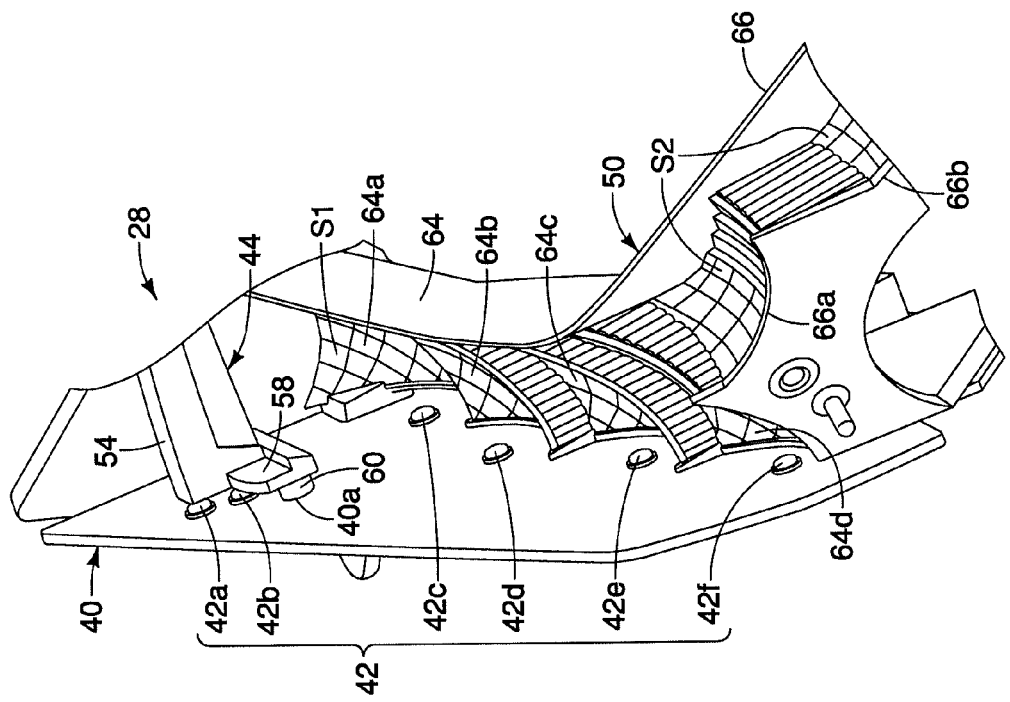
FIG. 6 is an enlarged view of the first circuit board and a portion of the reflector and light pipe.

In the illustrated embodiment, at least one of the first light sources 42 emits light into the light pipe 44 to illuminate the lens segment 34a of the inner auxiliary lens cover 34, while at least one of the first light sources 42 emits light onto the reflector 50 to illuminate the lens segment 34b of the inner auxiliary lens cover 34. In particular, in the illustrated embodiment, the first light sources 42 include a pair of light sources 42a and 42b (e.g., LEDs) located on the first circuit board 40 to emit light into the light pipe 44 to illuminate the lens segment 34a of the inner auxiliary lens cover 34. While two light sources are used to emit light into the light pipe 44 to illuminate the lens segment 34a, it will be apparent to those skilled in the vehicle lighting field that the one or more than two LEDs can be used as needed and/or desired. Furthermore, the first light sources 42 also include four additional light sources 42c, 42d, 42e and 42f (e.g., LEDs) located on the first circuit board 40 to emit light onto the reflector 50 to illuminate the lens segment 34b of the inner auxiliary lens cover 34. As best seen in FIG. 6, in the illustrated embodiment, the first light sources 42 located on the first circuit board 40 are a total of six LEDs (i.e., the light sources 42a, 42b, 42c, 42d, 42e and 42f). However, it will be apparent to those skilled in the art that the first circuit board 40 can include a various number of light sources (e.g., LEDs) as needed and/or desired to provide illumination for the vehicle auxiliary lamp unit 28.

Preferably, as illustrated, the light sources 42c, 42d, 42e and 42f are linearly aligned on the first circuit board 40, while the light sources 42a and 42b are offset from the linear orientation of the light sources 42c, 42d, 42e and 42f on the first circuit board 40. Also preferably, the illumination of the light sources 42a and 42b can be controlled independently of the light sources 42c, 42d, 42e and 42f using a conventional control circuit provided on the first circuit board 40.

Here, in the illustrated embodiment, each of the light sources 42a and 42b constitutes a first of the first light sources 42 that emits light longitudinally into the light pipe 44, while the light source 42c constitutes a second of the first light sources 42 that emits light onto the reflector 50 which reflects at least a portion of the light from the light source 42c transversely through a portion of the light pipe 44 that crosses in front of the reflector 50. In this way, an intersecting area of the lens segments 34a and 34b of the inner auxiliary lens cover 34 can be uniformly illuminated with respect to the other areas of the lens segments 34a and 34b of the inner auxiliary lens cover 34.

In the illustrated embodiment, the second light sources 48 include three light sources 48a, 48b and 48c (e.g., LEDs) located on the second circuit board 46. The light sources 48a, 48b and 48c are arranged to emit light onto the reflector 50 to illuminate the lens segment 34c of the inner auxiliary lens cover 34. Preferably, as illustrated, the light sources 48a, 48b and 48c are linearly aligned on the second circuit board 46. Also preferably, the illumination of the light sources 48a, 48b and 48c can be controlled independently of the light sources 42a, 42b, 42c, 42d, 42e and 42f using a conventional control circuit provided on the second circuit board 46.

Accordingly, in the illustrated embodiment, a total of nine LEDs serve as the light sources that illuminate the auxiliary lamp unit 28. The additional ones of the plurality of first light sources 42b, the second of the plurality of first light sources 42c and the plurality of second light sources 48 comprise a total of seven LEDs that are linearly oriented on the first and second circuit boards 40 and 46. While the auxiliary lamp unit 28 as illustrated includes a total of nine LEDs, it will be apparent to those skilled in the art that the auxiliary lamp unit may be illuminated by a various number of LEDs as needed and/or desired.

Preferably, the illumination of the first and second light sources 42 and 48 can be controlled either automatically based on one or more prescribed conditions and/or manually to attain a plurality of illumination settings. Thus, depending on the illumination setting, illumination intensity of the first and second light sources 42 and 48 will be different. For example, when a park mode is selected, the light sources 42c, 42d, 42e, 42f, 48a, 48b and 48c (seven LEDs) that illuminate the lens segments 34b and 34c are powered at approximately four percent power (flux range 2.75-5.5 lm/LED), while the one of the light sources 42a and 42b is powered at four percent and the other of the light sources 42a and 42b is powered at one hundred percent. The purpose of powering the one of the light sources 42a and 42b at one hundred percent is to maintain consistent illumination intensity with the lens segments 34b and 34c when the vehicle is in the park mode. Also for example, when a daytime running light (DRL) mode is selected, all of the light sources 42c, 42d, 42e, 42f, 48a, 48b and 48c (nine LEDs) for illuminating the lens segments 34a, 34b and 34c are powered at one hundred percent power (flux range 70.4-140.8 lm/LED).

Figure 7:
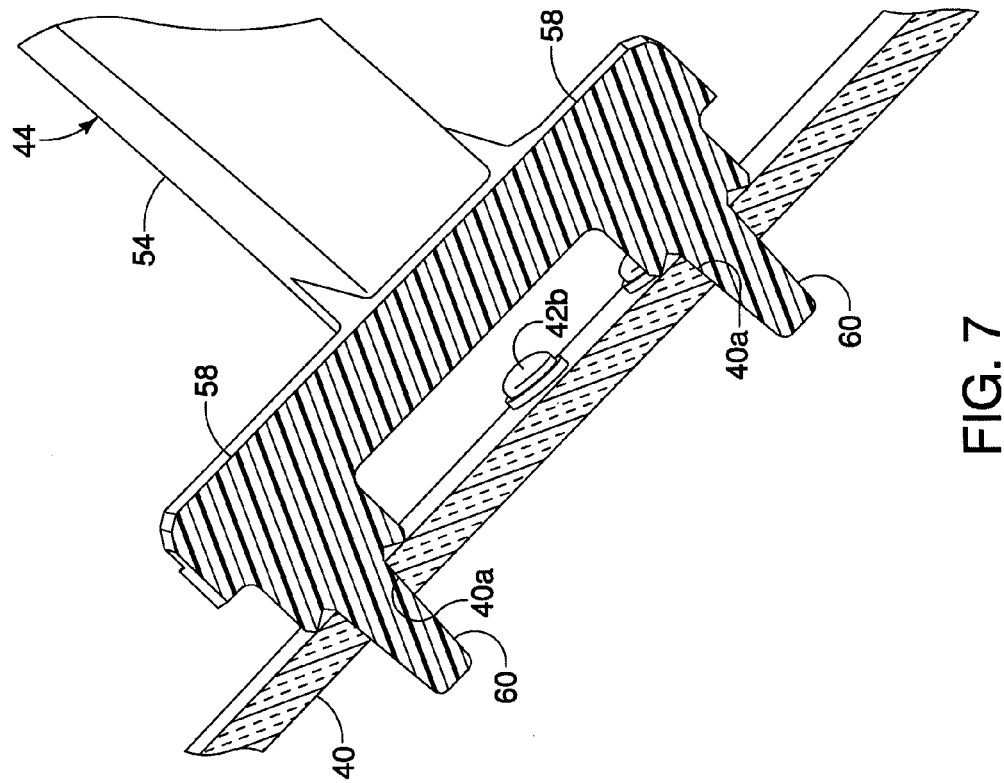
FIG. 7 is a sectional view of a portion of the auxiliary lamp unit showing the connection between the elongated light pipe and the first circuit board.

Now, the light pipe 44 will be discussed in more detail with reference to FIGS. 5 to 11. The light pipe 44 is located near the first circuit board 40 to receive light emitted by the light sources 42a and 42b of the first light sources 42. The light pipe 44 is formed from a material that can transmit and diffuse light in preselected amounts across the length of the light pipe 44 as explained below. The light pipe 44 is dimensioned to extend along the lens segment 34a of the inner auxiliary lens cover 34. Here, as best seen in FIGS. 5 to 7, in the illustrated embodiment, the light pipe 44 directly contacts the first circuit board 40 for accurate positioning of the light pipe 44 with respect to the first light sources 42 and the reflector 50. The structure for positioning the light pipe 44 with respect to the light sources 42a and 42b of the first light sources 42 will be discussed below.

Figure 10:
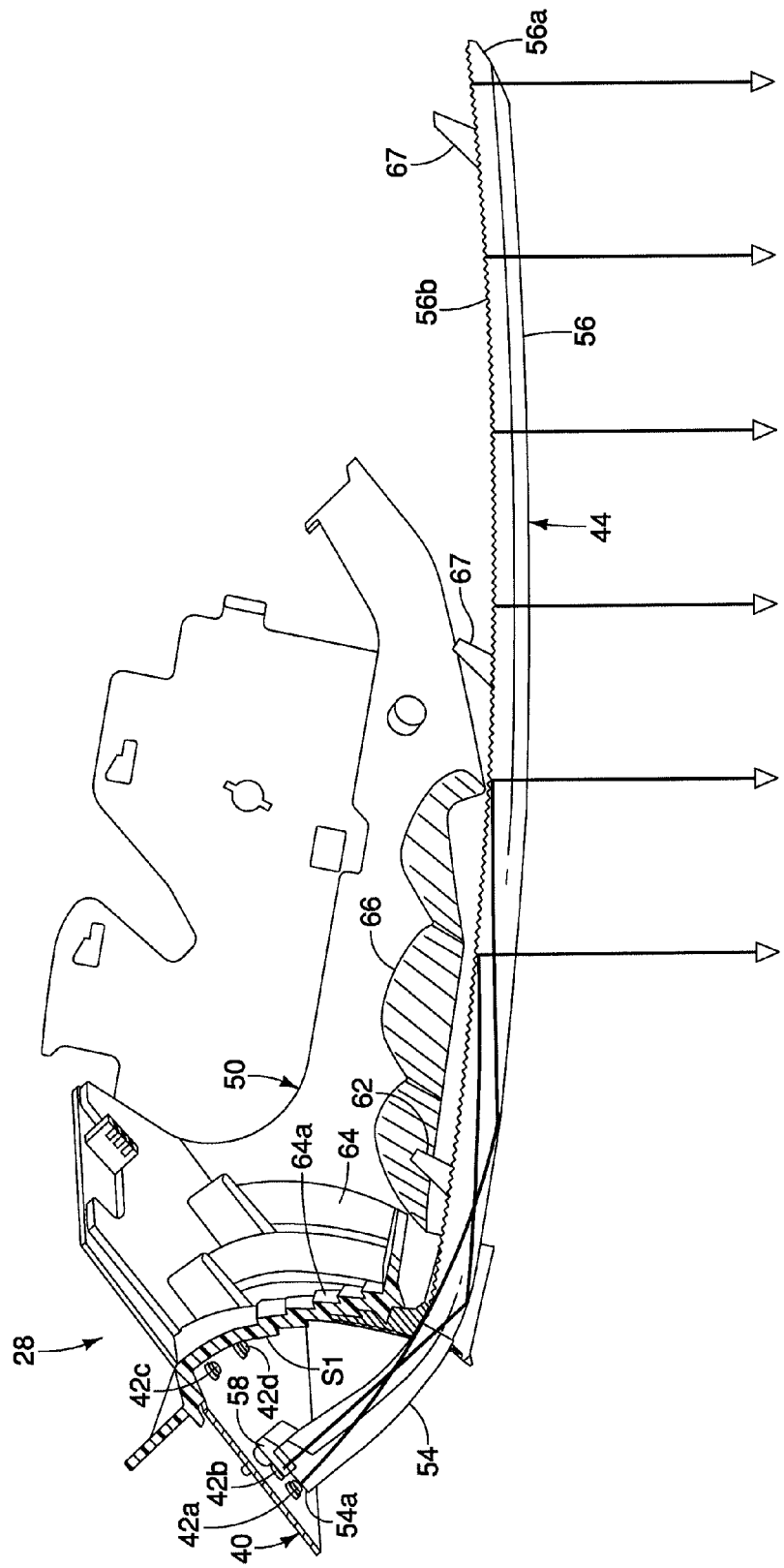
FIG. 10 is a top view of the auxiliary lamp unit with a portion of the reflector and the light pipe carrier broken away to show the light path of the light reflected by the elongated light pipe.

As best seen in FIG. 5, the light pipe 44 includes a first portion 54 and a second portion 56. The first and second portions 54 and 56 of the light pipe 44 define a light body. The first portion 54 defines a proximal end 54a of the light body, while the second portion 56 defines a distal end 56a of the light body. The first portion 54 is free of any faceted surfaces that transmit and diffuse light from the first light sources 42. The second portion 56, on the other hand, has a plurality of faceted surfaces 56b for reflecting the light emitted from the light sources 42a and 42b in a direction transverse to a longitudinal axis of the second portion 56 of the light body and through the lens segment 34a of the inner auxiliary lens cover 34. The faceted surfaces 56b are in the shape of teeth or sharp ribs that are formed along a rearward face of the light pipe 44. The faceted surfaces 56b are provided uniformly across the length of the second portion 56 of the light pipe 44. On the other hand, the first portion 54 is free of any light reflecting features such that the light emitted from the light sources 42a and 42b passes longitudinally through the first portion 54 without substantially passing out of the first portion 54. As best seen in FIG. 10, the light sources 42a and 42b illuminate the second portion 56 of the light pipe 44 due to the reflection from the faceted surfaces 56b on the second portion 56. Because the first portion 54 of the light pipe 44 is free of any faceted surfaces 56b, light emitted by light sources 42a and 42b passes through the first portion 54 of the light pipe 44 without the first portion 54 diffusing a portion of the light.

As seen in FIG. 7, the first portion 54 of the light pipe 44 has a pair of flanges 58 extending in opposite directions from the first portion 54 adjacent to the proximal end 54a of the light pipe 44. Each of the flanges 58 has at least one locating projection 60. The flanges 58 and the locating projections 60 are preferably formed as a one-piece member of a single material together with the first and second portions 54 and 56 of the light pipe 44. In this way, the flanges 58 and the locating projections 60 are also transparent.

The first circuit board 40 has a pair of locating apertures 40a for receiving the locating projections 60 of the light pipe 44. While a pair of locating apertures and a pair of locating projections are used in the illustrated embodiment, it will be apparent to those skilled in the vehicle lighting field that the first circuit board 40 can have only one locating aperture and the light pipe 44 can have only one locating projection as needed and/or desired. Likewise, it will be apparent to those skilled in the vehicle lighting field that the first circuit board 40 can have more than two locating apertures and the light pipe 44 can have more than two locating projections as needed and/or desired.

As shown, the light sources 42a and 42b are positioned between the locating projections 60 of the light pipe 44. The locating projections 60 and the flanges 58 of the light pipe 44 are arranged to straddle the light emitted by the light sources 42a and 42b. This way, the light pipe 44 captures all of the light emitted by the light sources 42a and 42b.

Figure 8:
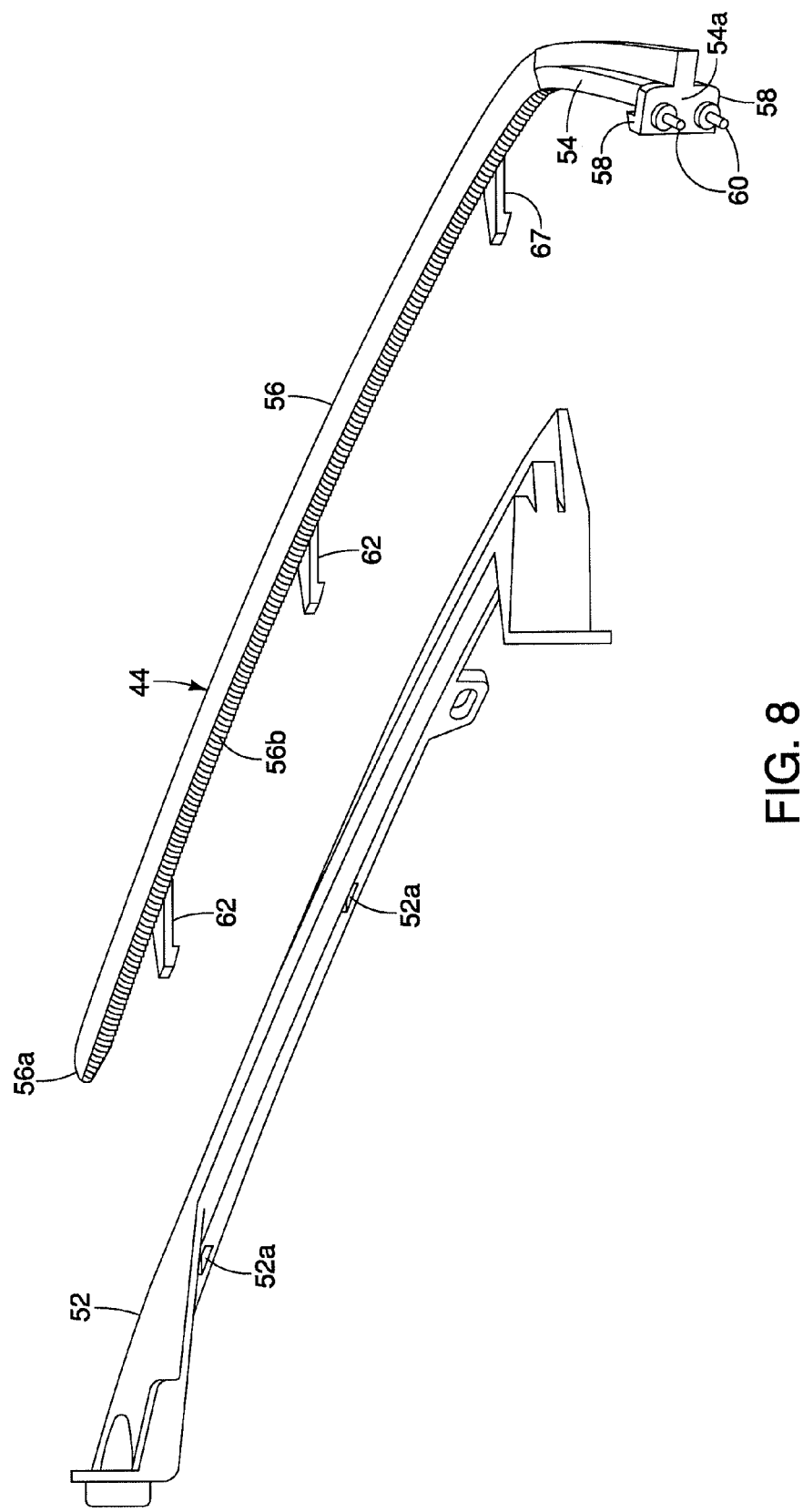
FIG. 8 is an exploded perspective view of the elongated light pipe and the light pipe carrier of the auxiliary lamp unit.
Figure 9:
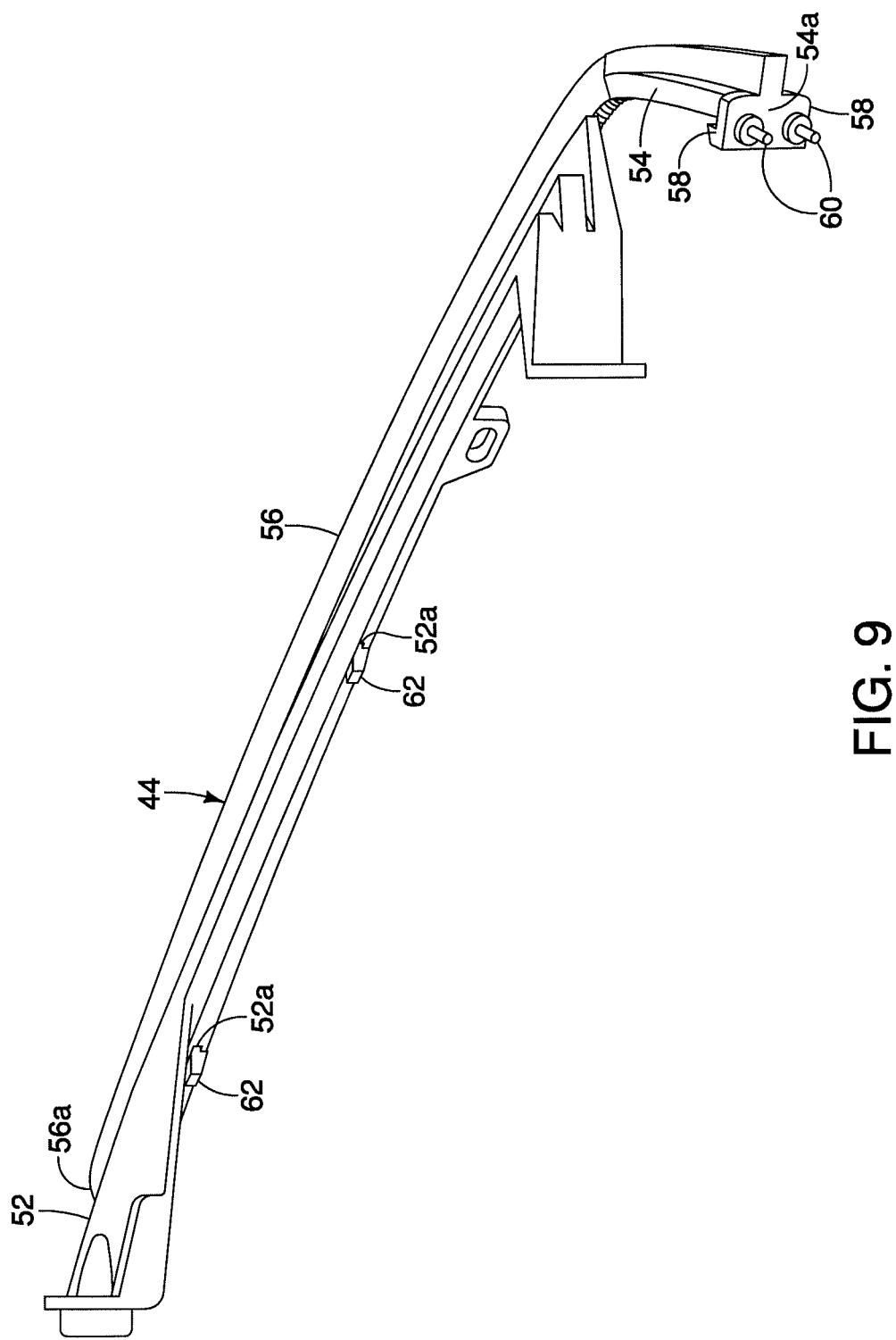
FIG. 9 is a perspective of the elongated light pipe attached to the light pipe carrier.

As seen in FIGS. 8 and 9, the second portion 56 of the light pipe 44 has three mounting tabs 62 extending outwardly from the rear surface. The mounting tabs 62 are designed to snap-fit on to the light pipe carrier 52. In particular, the light pipe carrier 52 includes three receiving slots 52a (only two shown in FIG. 8) that receive the mounting tabs 62 so that an abutment of the mounting tabs 62 engages the light pipe carrier 52 to attach and position the light pipe 44 with respect to the light pipe carrier 52. In this way, the second portion 56 of the light pipe 44 is supported by the light pipe carrier 52. In other words, the light pipe carrier 52 also serves to support the light pipe 44 within the headlamp housing 18. In this way, the light pipe carrier 52 is fixedly secured to the headlamp housing 18 at suitable locations in a conventional manner.

Now, the reflector 50 will be discussed in more detail with reference to FIGS. 4 to 6. Basically, the reflector 50 has a first reflective section 64 and a second reflective section 66 arranged to form a general L-shape. The reflector 50 is a conventional reflector made of a plastic material having a mirrored reflective surface along the first and second reflective sections 64 and 66 to reflect light emitted by the first and second light sources 42 and 48 located on the first circuit board 40. The first reflective section 64 is positioned to reflect light emitted by the light sources 42c, 42d, 42e and 42f. On the other hand, the second reflective section 66 of the reflector 50 is arranged to reflect light from the light sources 48a, 48b and 48c located on the second circuit board 46.

The first reflective section 64 includes a plurality (four) of curved reflective portions 64a, 64b, 64c and 64d arranged to capture and reflect light emitted by the first light sources 42. Each of the curved reflective portions 64a, 64b, 64c and 64d has a light reflective surface S1 for reflecting light from the light sources 42c, 42d, 42e and 42f towards the lens segment 34b. As used herein, the phrase "light reflective surface" refers to a surface that exhibits specular reflection. Here, in the illustrated embodiment, the light reflective surfaces S1 are mirrored, faceted surfaces. Also preferably, each of the curved reflective portions 64a, 64b, 64c and 64d is parabolic-shaped. The curved reflective portions 64a, 64b, 64c and 64d are integrally arranged to define the first reflective section 64 of the reflector 50.

The second reflective section 66 includes a plurality (three) of curved reflective portions 66a, 66b and 66c arranged to capture and reflect light emitted by the second light sources 48. Each of the curved reflective portions 66a, 66b and 66c has a light reflective surface S2 for reflecting light from the light sources 48a, 48b and 48c towards the lens segment 34c. Here, in the illustrated embodiment, the light reflective surfaces S2 are mirrored, faceted surfaces. Also preferably, each of the curved reflective portions 66a, 66b and 66c is parabolic-shaped. The curved reflective portions 66a, 66b and 66c are integrally arranged to define the second reflective section 66 of the reflector 50.

Referring back to FIG. 4, the reflector 50 is fixedly secured to the headlamp housing 18 at suitable locations in a conventional manner. In the illustrated embodiment, the reflector 50 is directly connected to the first circuit board 40 at five locations (not shown). The first reflective section 64 of the reflector 50 includes three first locating projections (not shown) that are received by three first receiving holes (not shown) of the first circuit board 40. At the same time, the second reflective section 66 of the reflector 50 includes two second locating projections that are received by two second receiving holes of the second circuit board 46 at the attachment locations. Preferably, the reflector 50 is further secured to the first and second circuit boards 40 and 46 using fasteners, or threaded screws. In the illustrated embodiment, the first reflective section 64 of the reflector 50 is secured to the first circuit board 40 by two threaded screws (not shown) at two attachment locations, while the second reflective section 66 of the reflector 50 is secured to the second circuit by two threaded screws (not shown) at two attachment locations.

Figure 11:
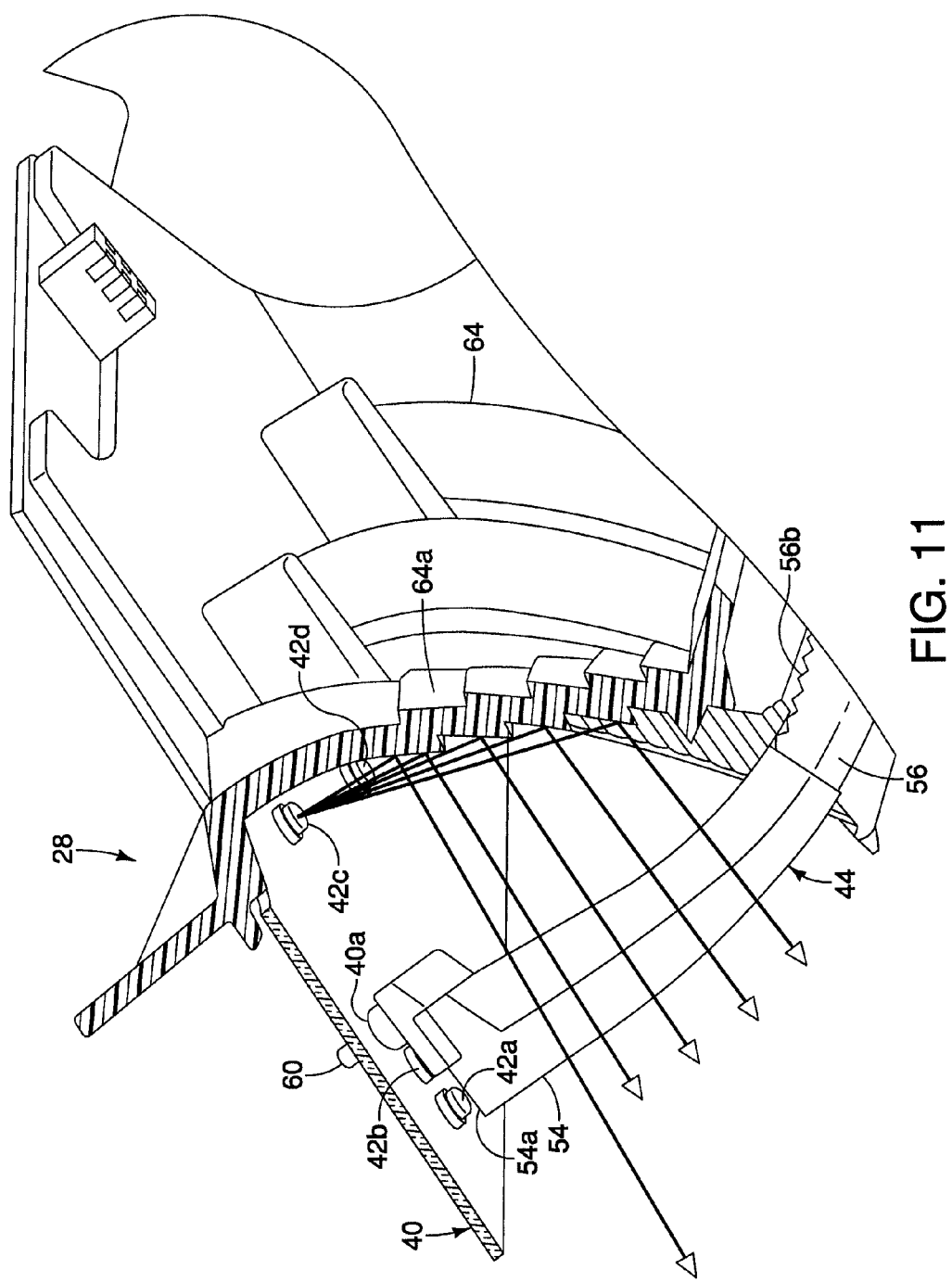
FIG. 11 is an enlarged top view of a portion of the auxiliary lamp unit illustrated in FIG. 10 to show the light path reflected by the reflector through the smooth portion of the elongated light pipe.

As seen in FIG. 11, illumination of a transition area between the lens segments 34a and 34b is illustrated. The transition area is generally the area located in front of the curved reflective portion 64a that is not illuminated by the light sources 42a and 42b, but rather by the light emitted from the light source 42c and reflected by the curved reflective portion 64a. This arrangement provides a continuous lit appearance between the lens segments 34a and 34b in that the transition area is illuminated by light emitted by the light source 42c being reflected by the curved reflective portion 64a.

The first portion 54 of the light pipe 44 is part of the transition area. In this way, the first portion 54 of the light pipe 44 extends in front of the curved reflective portion 64a of the reflector 50. In the illustrated embodiment, the first portion 54 of the light pipe 44 is curved so that it can extend in front of the curved reflective portion 64a. The curved reflective portion 64a reflects light emitted by the light source 42c through the first portion 54 of the light pipe 44 at the transition area. As previously mentioned, the first portion 54 of the light pipe 44 is free of any faceted surfaces 56b. As a result, light from the light sources 42a and 42b is not diffused by the first portion 54 of the light pipe 44. Instead, as shown in FIG. 11, the light emitted by the light source 42c is reflected by the curved reflective portion 64a. The curved reflective portion 64a reflects the emitted light such that it passes through the first portion 54 of the light pipe 44. The reflected light passing through the first portion 54 of the light pipe 44 thereby illuminates the transition area between the lens segments 34a and 34b.

As previously mentioned, the flanges 58 and the pair of locating projections 60 of the light pipe 44 are made of a transparent material and are integrally formed with the light pipe body. This way, the reflected light from the light source 42c passes uninterrupted through the flanges 32 and the locating projections 60. This allows for a continuous illumination appearance at the transition area between the lens segments 34a and 34b.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle auxiliary lamp unit comprising:
    a first circuit board having a plurality of first light sources and at least one aperture; and
    an elongated light pipe having a proximal end and a distal end, the proximal end being located by the first circuit board and arranged to receive light from a first of the plurality of first light sources,
    the proximal end of the elongated light pipe including at least one locating projection that is received by the at least one aperture of the first circuit board.

2. The vehicle auxiliary lamp unit according to claim 1, wherein
    the elongated light pipe includes
        a first portion located adjacent the proximal end, the first portion being configured to be free of any faceted surfaces; and
        a second portion located adjacent the distal end, the second portion having a plurality of faceted surfaces arranged to reflect light from the first of the plurality of first light sources in a direction transverse to the center longitudinal axis of the elongated light pipe.

3. The vehicle auxiliary lamp unit according to claim 1, wherein
    the plurality of first light sources is light emitting diodes.

4. The vehicle auxiliary lamp unit according to claim 2, further comprising
    a light pipe housing connected to the second portion of the elongated light pipe.

5. The vehicle auxiliary lamp unit according to claim 2, further comprising
    a reflector having a first curved reflective portion reflecting light from a second of the plurality of first light sources.

6. The vehicle auxiliary lamp unit according to claim 5, wherein
    the first portion of the elongated light pipe extends in front of the first curved reflective portion of the reflector so that the first curved reflective portion reflects light through the first portion of the elongated light pipe.

7. The vehicle auxiliary lamp unit according to claim 5, wherein
    the reflector further includes a plurality of second curved reflective portions arranged to receive light from additional ones of the plurality of first light sources, each of the plurality of second curved reflective portions being offset from the first curved reflective portion.

8. The vehicle auxiliary lamp unit according to claim 1, wherein
    the first circuit board includes two apertures, and the proximal end of the elongated light pipe includes a pair of flanges, each of the flanges having the at least one locating projection disposed in one of the two apertures.

9. The vehicle auxiliary lamp unit according to claim 8, wherein
    the flanges and the locating projections are formed as a one-piece, single unit of material with the elongated light pipe.

10. The vehicle auxiliary lamp unit according to claim 9, wherein
    the flanges and the locating projections are transparent such that light from the plurality of first light sources passes uninterrupted through the flanges and the locating projections.

11. The vehicle auxiliary lamp unit according to claim 7, further comprising
    a second circuit board having a plurality of second light sources emitting light on a plurality of third curved reflective portions of the reflector.

12. The vehicle auxiliary lamp unit according to claim 11, wherein
    the plurality of second light sources is light emitting diodes.

13. The vehicle auxiliary lamp unit according to claim 11, wherein
    the reflector includes a first section and a second section arranged to form a general L-shape, the second section extending transverse to the longitudinal axis of the elongated light pipe.

14. The vehicle auxiliary lamp unit according to claim 13, wherein
    the first section includes the first curved reflective portion for receiving light from the second of the plurality of first light sources, and the plurality of second curved reflective portions for receiving light from the additional ones of the plurality of first light sources; and
    the second section includes the plurality of third curved reflective portions for receiving light from the plurality of second light sources.

15. A vehicle auxiliary lamp unit comprising:
    a first circuit board having a plurality of first light sources,
    an elongated light pipe having a proximal end and a distal end, and arranged to receive light from a first of the plurality of first light sources; and
    a reflector including a first curved reflective portion disposed behind the elongated light pipe to reflect light from a second of the plurality of first light sources, and at least one second curved reflective portion located offset from the first curved reflective portion and arranged to receive light from the other of the plurality of first light sources, the at least one second curved reflective portion being integrally formed with the first curved reflective portion to define a first section of the reflector having an overall elongated shape extending in a direction transverse to a longitudinal axis of the light pipe.

16. The vehicle auxiliary lamp unit according to claim 15, wherein
    the elongated light pipe includes
        a first portion located adjacent the proximal end, the first portion being configured to be free of any faceted surfaces; and
        a second portion located adjacent the distal end, the second portion having a plurality of faceted surfaces arranged to reflect light from the first of the plurality of first light sources in a direction transverse to the center longitudinal axis of the elongated light pipe.

17. The vehicle auxiliary lamp unit according to claim 15, further comprising
    a second circuit board having a plurality of second light sources.

18. The vehicle auxiliary lamp unit according to claim 17, wherein
    the reflector includes a second section arranged to form a general L-shape with respect to the first section, the second section including at least one third curved reflective portion arranged to receive light from the plurality of second light sources.

19. The vehicle auxiliary lamp unit according to claim 16, further comprising
a light pipe housing connected to the second portion of the elongated light pipe.

20. The vehicle auxiliary lamp unit according to claim 17, wherein
the plurality of first and second light sources is light emitting diodes.

* * * * *